(12) United States Patent  
Sistare et al.

(10) Patent No.: US 6,601,089 B1  
(45) Date of Patent: Jul. 29, 2003

(54) SYSTEM AND METHOD FOR ALLOCATING BUFFERS FOR MESSAGE PASSING IN A SHARED-MEMORY COMPUTER SYSTEM

(75) Inventors: Steven J. Sistare, Westford, MA (US); Terry D. Dontje, Maynard, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/337,586

(22) Filed: Jun. 21, 1999

(51) Int. Cl.$^7$ ............................................. G06F 15/167
(52) U.S. Cl. ........................ 709/213; 709/214; 709/215
(58) Field of Search ................... 709/213, 214, 709/215, 206, 207; 710/52, 56

(56) References Cited

U.S. PATENT DOCUMENTS

| | | |
|---|---|---|
| 5,771,383 A | 6/1998 | Magee et al. |
| 5,877,812 A * | 3/1999 | Krause et al. ............... 348/385 |
| 5,974,469 A | 10/1999 | Shoji et al. |
| 5,987,496 A * | 11/1999 | Shen et al. .................. 709/200 |
| 6,029,205 A | 2/2000 | Alferness et al. |
| 6,131,113 A | 10/2000 | Ellsworth et al. |
| 6,145,007 A | 11/2000 | Dokic et al. |
| 6,151,644 A * | 11/2000 | Wu ............................... 710/52 |
| 6,256,315 B1 * | 7/2001 | Barbas et al. ................ 370/412 |
| 6,314,501 B1 | 11/2001 | Gulick et al. |

* cited by examiner

*Primary Examiner*—Frantz B. Jean  
(74) *Attorney, Agent, or Firm*—Meyertons Hood Kivlin Kowert & Goetzel, P.C.; B. Noël Kivlin

(57) ABSTRACT

A communication arrangement facilitates transfer of messages among a plurality of processes in with a computer, the computer having a memory shared by the processes. The communication arrangement comprises, allocated to each process, a plurality of buffers, and a plurality of postboxes each associated with one of the other processes. Each process includes a message size determination module and a message transfer module. The message size determination module is configured to determine whether a message to be transferred to another process can be accommodated by a postbox. The message transfer module is configured to (i) in response to a positive determination by the message size determination module, store the message in the postbox associated with the process as allocated to the other process, and (iii) in response to a negative determination by the message size determination module, store the message in one of the buffers allocated thereto, and providing a pointer to the one of the buffers in the postbox associated with the process as allocated to the other process.

43 Claims, 7 Drawing Sheets

SYSTEM AND METHOD FOR ALLOCATING BUFFERS FOR MESSAGE PASSING IN A SHARED-MEMORY COMPUTER SYSTEM

FIELD OF THE INVENTION

The invention relates generally to the field of digital computer systems, and more particularly to mechanisms for facilitating transfer of information between and among a plurality of processes.

BACKGROUND OF THE INVENTION

Computers typically execute programs in one or more processes or threads (generally "processes") on one or more processors. If a program comprises a number of cooperating processes which can be processed in parallel on a plurality of processors, sometimes groups of those processes need to communicate to cooperatively solve a particular problem. Two basic architectures have been for multi-processor computer systems, namely, distributed memory systems and shared memory systems. In a computer system constructed according to the distributed memory architecture, processors and memory are allocated to processing nodes, with each processing node typically having a processor and an associated "node memory" portion of the system memory. The processing nodes are typically interconnected by a fast network to facilitate transfer of data from one processing node to another when needed for, for example, processing operations performed by the other processing node. Typically in a computer constructed according to the distributed memory architecture, a processor is able to access data stored in its node memory faster that it would be able to access data stored in node memories on other processing nodes. However, contention for the node memory on each processing node is reduced since there is only one processor, that is, the processor on the processing node, which accesses the node memory for its processing operations, and perhaps a network interface which can access the node memory to store therein data which it received from another processing node, or to retrieve data therefrom for transfer to another processing node.

Typically, in a computer system constructed according to the shared memory architecture, the processors share a common memory, with each processor being able to access the entire memory in a uniform manner. This obviates the need for a network to transfer data, as is used in a computer system constructed according to the distributed memory architecture; however, contention for the shared memory can be greater than in a computer system constructed according to the distributed memory architecture. To reduce contention, each processor can be allocated a region of the shared memory which it uses for most of its processing operations. Although each processor's region is accessible to the other processors so that they (that is, the other processors) can transfer data thereto for use in processing by the processor associated with the respective region, typically most accesses of a region will be by the processor associated with the region.

A computer system can be constructed according to a combination of the distributed and shared memory architectures. Such a computer system comprises a plurality of processing nodes interconnected by a network, as in a computer system constructed according to the distributed memory architecture. However, each processing node can have a plurality of processors which share the memory on the respective node, in a manner similar to a computer constructed according to the shared memory architecture.

Several mechanisms have been developed to facilitate transfer of data among processors, or more specifically, between processing node memories, in the case of a computer system constructed according to the distributed memory architecture, and/or memory regions, in the case of a computer system constructed according to the shared memory architectures. In one popular mechanism, termed "message passing," processors transfer information by passing messages therearnong. Several well-known message passing specifications have been developed, including MPI and PVM. Generally, in message passing, to transfer data from one processor to another, the transferring processor generates a message including the data and transfers the message to the other processor. On the other hand, when one processor wishes to retrieve data from another processor, the retrieving processor generates a message including a retrieval request and transfers the message to the processor from which the data is to be retrieved; thereafter, the processor which receives the message executes the retrieval request and transfers the data to the requesting processor in a message as described above.

In a computer system constructed according to the distributed memory architecture, the messages using the message passing mechanism are transferred between processing nodes over the network and processed or otherwise handled by the respective processing node when they arrive at the respective destination. In a computer system constructed according to the shared memory architecture, several buffer arrangements have been developed to facilitate message transfer. In one arrangement, each process is provided with a plurality of buffers, each associated with one of the other processes. When an "i-th" process wishes to transfer a message to another "j-th" process, it (that is, the "i-th" process) deposits the message in a buffer $B(i,j)$ that is maintained therefor. Similarly, when the "j-th" process wishes to transfer a message to the "i-th" process, it (that is, the "j-th" process), will deposit the message in another buffer $B(j,i)$ maintained therefor. Thereafter, the "j-th" process can retrieve the message by copying it to its region of memory, after which the "i-th" process can again transfer a message to the "j-th" process. Allocating buffers in this manner ensures that there will be no contention for buffers as among processes attempting to transmit messages to the same process; thus, after the "i-th" process has deposited a message for the "j-th" process in buffer $B(i,j)$, the "k-th" process can also transfer a message to the "j-th" process by depositing the message in the buffer $B(k,j)$ before the "j-th" process has copied the "i-th" process's message from the buffer $B(i,j)$. However, since each buffer is typically relatively large, generally sufficiently large as to be able to accommodate a relatively large message, it will be appreciated that a significant portion of the memory address space may be required for the buffers, and further that the portion will increase, with increasing numbers of processes, on the order of $N^2$, where "N" is the number of processes.

In another mechanism, instead of providing relatively large buffers $B(i,j)$ for the respective processes, a buffer pool is provided comprising a plurality of buffers available to all of the processes, with the buffers $B(x)$ in the pool having sizes on the order of the sizes of the buffers $B(i,j)$. In addition, each process is provided with a relatively small buffer, referred to as a postbox P. When the "i-th" process wishes to transfer a message to the "j-th" process, if the message will fit into the postbox, it (that is, the "i-th" process) will store the message in its postbox $P(i,j)$ for the "j-th" process. On the other hand, if the message will not fit into the postbox, the "i-th" process will allocate a buffer B(x) from the pool, load the message into the buffer B(x) and load a pointer to the buffer B(x) in its postbox P(i,j) for the "j-th" process. Thereafter, the "j-th" process can detect that a message or pointer has been loaded into its postbox P(i,j) and retrieve it (that is, the message or pointer) therefrom. If the postbox P(i,j) contains a pointer, the "j-th" process can use the pointer to identify the buffer B(x) which contains the message and retrieve it (that is, the message) therefrom by copying it to its region of memory. After the "j-th" process has retrieved the message from the buffer B(x), it can return the buffer to the buffer pool. This mechanism provides the advantage that it reduces the amount of memory space which is needed to be provided from that described above, since the postboxes P(i,j) require far less space than the buffers B(i,j), and the number of buffers B(x) can be bounded, with the number being fixed, growing with "N," the number of processes perhaps linearly, or the like. However, some contention for buffers is possible with this mechanism. In addition, some mechanism needs to be provided to synchronize access to the buffers, to ensure that, after the "i-th" process has deposited a message for the "j-th" process in a buffer B(x), another "k-th" process does not deposit a message in the same buffer B(x) before the "j-th" process has retrieved the message. Typically, such lock/unlock mechanisms can become a bottleneck, particularly if a large number of processes wish to send messages contemporaneously.

SUMMARY OF THE INVENTION

The invention provides a new and improved system and method for allocating buffers for message passing in a shared-memory computer system, thereby to facilitate transfer of messages among processes which share the computer system's memory.

In brief summary, the invention provides a communication arrangement that facilitates transfer of messages among a plurality of processes in with a computer, the computer having a memory shared by the processes. The communication arrangement comprises, allocated to each process, a plurality of buffers, and a plurality of postboxes each associated with one of the other processes. Each process includes a message size determination module and a message transfer module. The message size determination module is configured to determine whether a message to be transferred to another process can be accommodated by a postbox. The message transfer module is configured to (i) in response to a positive determination by the message size determination module, store the message in the postbox associated with the process as allocated to the other process, and (iii) in response to a negative determination by the message size determination module, store the message in one of the buffers allocated thereto, and providing a pointer to the one of the buffers in the postbox associated with the process as allocated to the other process.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

Figure 1:
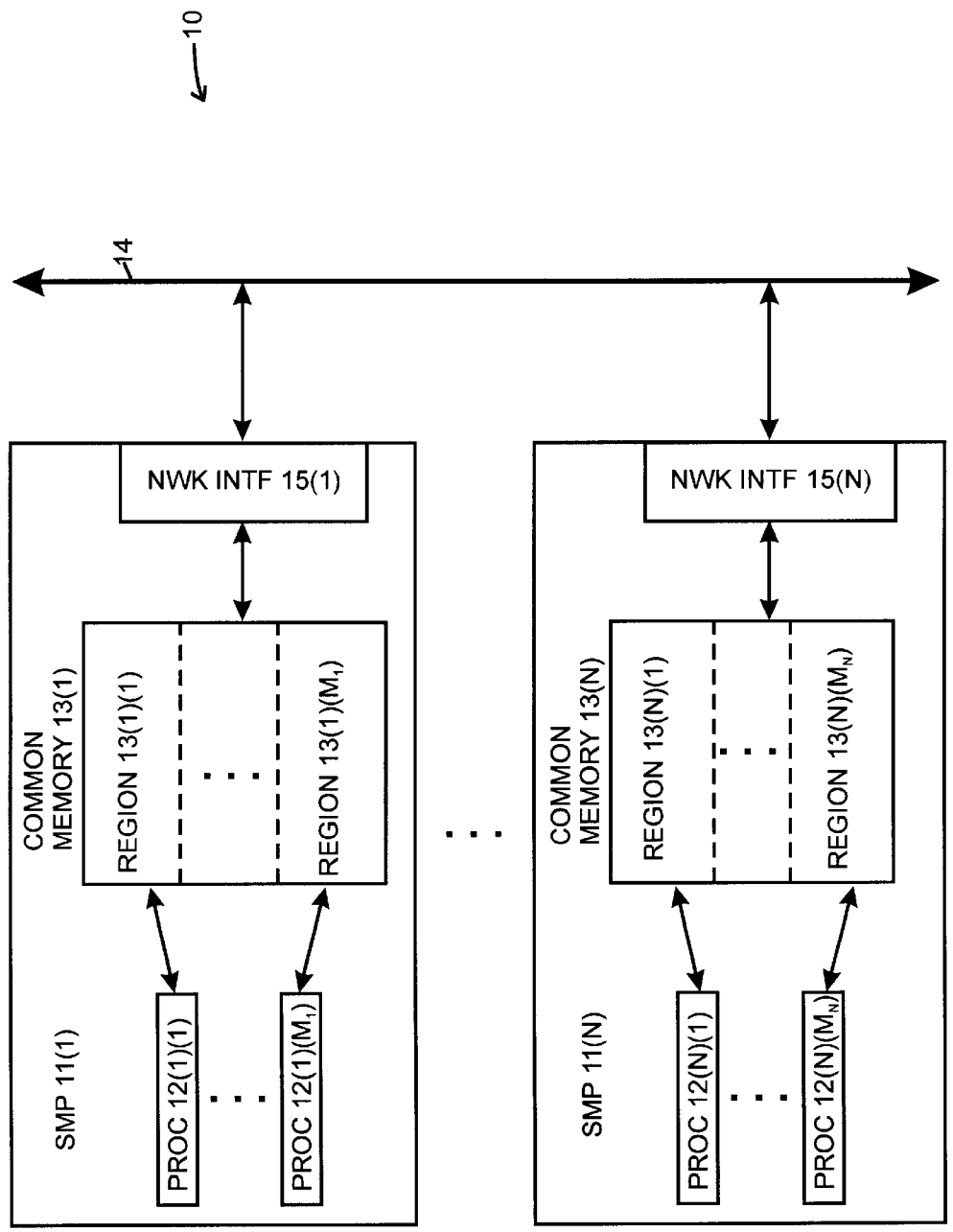
FIG. 1 schematically depicts a computer system including an arrangement for allocating buffers for message passing in a shared-memory computer system, constructed in accordance with the invention.

FIG. 1 schematically depicts a computer system 10 including an arrangement for allocating buffers for message passing in a shared-memory computer system, constructed in accordance with the invention. Generally, the computer system 10 includes one or more computers 11(1) through 11(N) (generally identified by reference numeral 11(n)), interconnected by a network represented by communication link 14. At least some of the computers 11(n) are constructed along a symmetric multi-processor ("SMP") architecture, with each SMP including hardware resources comprising a plurality of processors (not separately shown) which share common memory resources (also not separately shown). In the following, it will be assumed that the computers 11(n) are all constructed along the lines of an SMP architecture, and may also be referenced as SMP's 11(n). In the computer 10 depicted in FIG. 1, each SMP 11(n) can process in parallel a plurality of processes or threads (generally, "processes") 12(1)(1) through 12(N)(M) (generally identified by reference numeral 12(n)(m)) organized in one or more programs. The processes 12(n)(m) in each SMP 11(n) share a common memory 13(n), with each process being allocated a region 13(n)(m) of the memory 13(n). The total number of processes 12(n)(m) which each SMP 11(n) can execute may be greater than the total number of processors which the respective SMP 11(n) maintains, and, if so, the computer's operating system (not shown) will enable the processes to be executed in a series of time intervals or slots, with selected ones of the processes 12(n)(m) being executed at any point in time.

As noted above, each process 12(n)(m) is allocated a region 13(n)(m) of the common memory 13(n), which it will normally use in its processing operations. Each process 12(n')(m') can, however, communicate with another process 12(n')(m") (m" m')) to send information thereto by sending one or more messages thereto. The messages effectively result in the storing of information in the memory region 13(n')(m") of memory 13(n') allocated to that process 12(n') (m"). A number of message passing methodologies which may be used by the processes 12(n)(m) are known to those skilled in the art. After the information has been stored into the memory region 13(n')(m") allocated to that process 12(n')(m"), the process 12(n')(m") can use the information in its processing operations.

As noted above, the SMP's 11(n) are interconnected by a communication link 14. Each SMP also includes a network interface 15(n) to connect the respective SMP 11(n) to the communication link 14 to facilitate transfer of information among the SMP's 11(n), and specifically among processes 12(n)(m) maintained thereby. For example, a process 12(n')(m') can communicate with another process 12(n")(m") (where n" n', but m" may equal m') to send information thereto by sending one or more messages thereto. In that case, the messages will be transmitted by the network interface 15(n') of SMP 11(n') and transmitted over the communication link 14 to the network interface 15(n") of SMP 11(n"), and the network interface 15(n") will, in turn, store the information in the memory region 13(n")(m") associated with the process 12(n")(m"). After the information has been stored into the memory region 13(n")(m") allocated to that process 12(n")(m"), the process 12(n")(m") can use the information in its processing operations.

The invention provides an arrangement for allocating buffers for use in message passing among processes in the computer system 10. Generally, according to the buffer allocation arrangement, each process 12(n)(m) maintains:
(i) a postbox P(n,m)(n',m') associated with each of the other processes 12(n',m'), and
(ii) a buffer pool comprising a plurality of buffers B(n, m)(x) (x=1, . . . , $X_{n,m}$)

The postboxes P(n,m)(n',m') and buffer pool associated with process 12(n)(m) may be established in the region 13(n)(m) associated with the process 12(n)(m), or in a memory region (not separately shown) that is shared among all of the processes. The process 12(n)(m) has exclusive ownership and control over the buffers B(n,m)(x) in its buffer pool. Generally, when a process 12(n)(m) wishes to send a message to another process 12(n')(m'), if the message is small enough to fit into a postbox, it (that is, process 12(n)(m)) will load the message into the postbox P(n',m')(n,m) which process 12(n')(m') maintains therefor, after which the process 12(n')(m') can retrieve the message by copying it from the postbox to its region 13(n')(m') of the common memory 13(n). On the other hand, if the message is not small enough to fit into a postbox, the process 12(n)(m) selects one of its buffers B(n,m)($x_y$) (1y $X_{n,m}$), load the message into the selected buffer B(n,m)($x_y$), and store a pointer to the selected buffer B(n,m)($x_y$) in the postbox P(n',m')(n,m) which process 12(n')(m') associates with process 12(n)(m). Thereafter, the process 12(n')(m') can retrieve the message by initially retrieving the pointer from its postbox P(n',m')(n,m), using the pointer to identify the buffer B(n,m)($x_y$) into which the message was loaded, and copying the message from the identified buffer B(n,m)($x_y$) to its region 13(n')(m') of the common memory 13(n).

The inventive buffer allocation arrangement provides a number of advantages. Since the number $X_{n,m}$ of buffers B(n,m)(x) in the buffer pool that is associated with each process can be determined a priori, and need not be related to the number of processes, the total number of buffers B(n,m)(x) can vary according to the number of processes, rather than the square of the number of processes, as with the first shared-memory message passing mechanism described above. Depending on the types of processing operations performed by the program comprising the processes 12(n) (m) and communication patterns thereamong, it may be desirable to provide more buffers than for processes comprising other programs. Alternatively or in addition, it may be desirable to provide different numbers of buffers B(n,m) (x) for the processes 12(n)(m) comprising a program, depending on communication patterns thereamong.

In addition, since each process 12(n)(m) has ownership over the buffers B(n,m)(x) in its buffer pool, the buffer allocation arrangement avoids the necessity of allocating a buffer from a common pool, with the attendant synchronization mechanism, as is required in connection with the second shared-memory message passing mechanism described above, thus avoiding the lock/unlock bottleneck.

Figure 2:
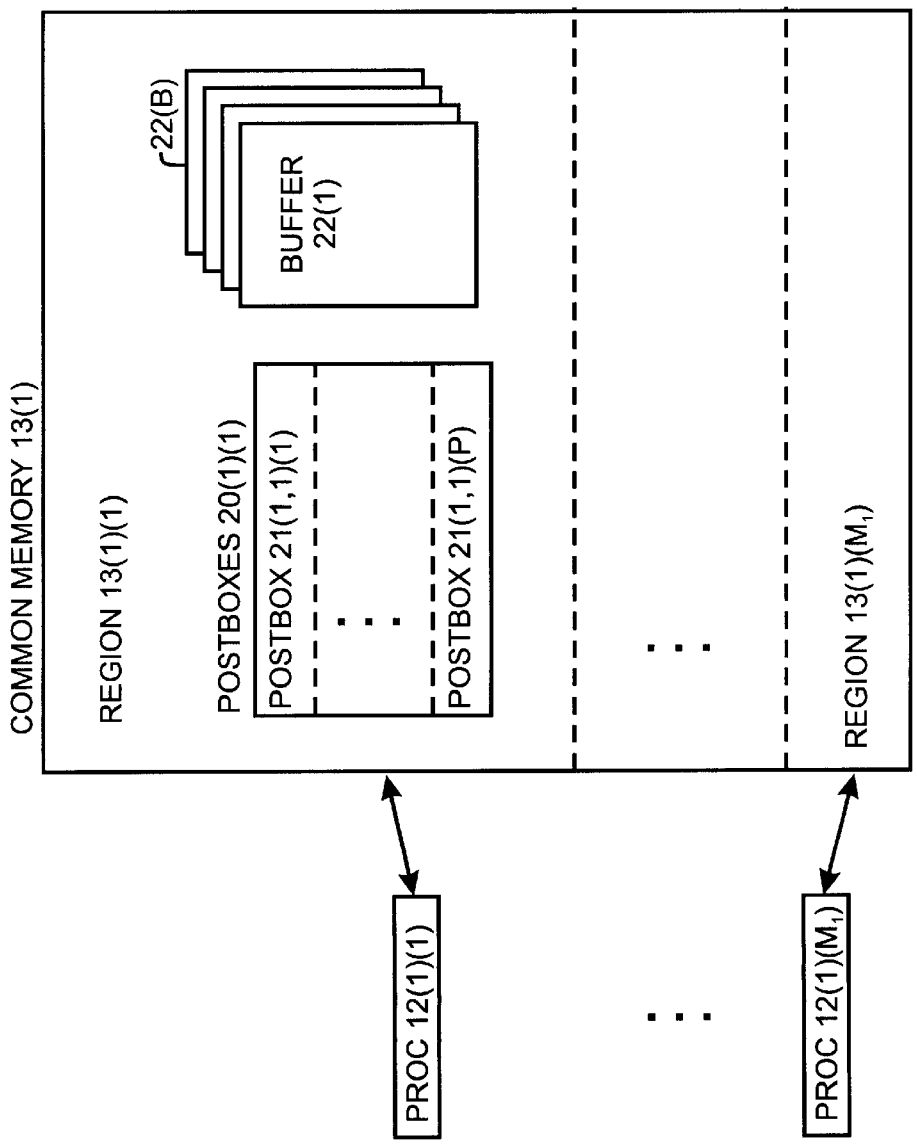
FIG. 2 schematically depicts data structures which are useful in connection with the buffer allocation arrangement for the computer system depicted in FIG. 1.
Figure 3:
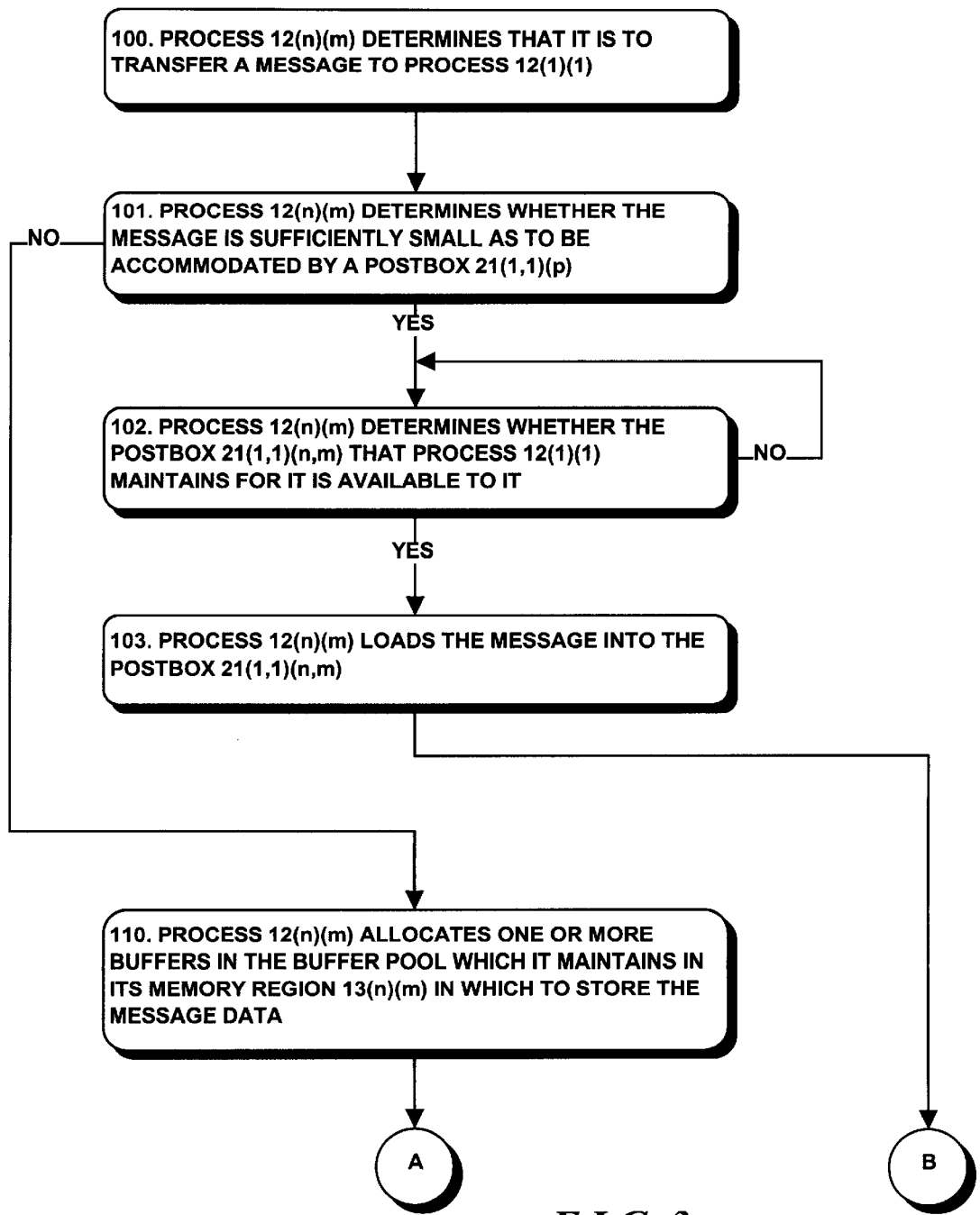
FIG. 3 is a flow chart describing operations performed by a process in connection with transferring a message using the buffer allocation arrangement.
Figure 3A:
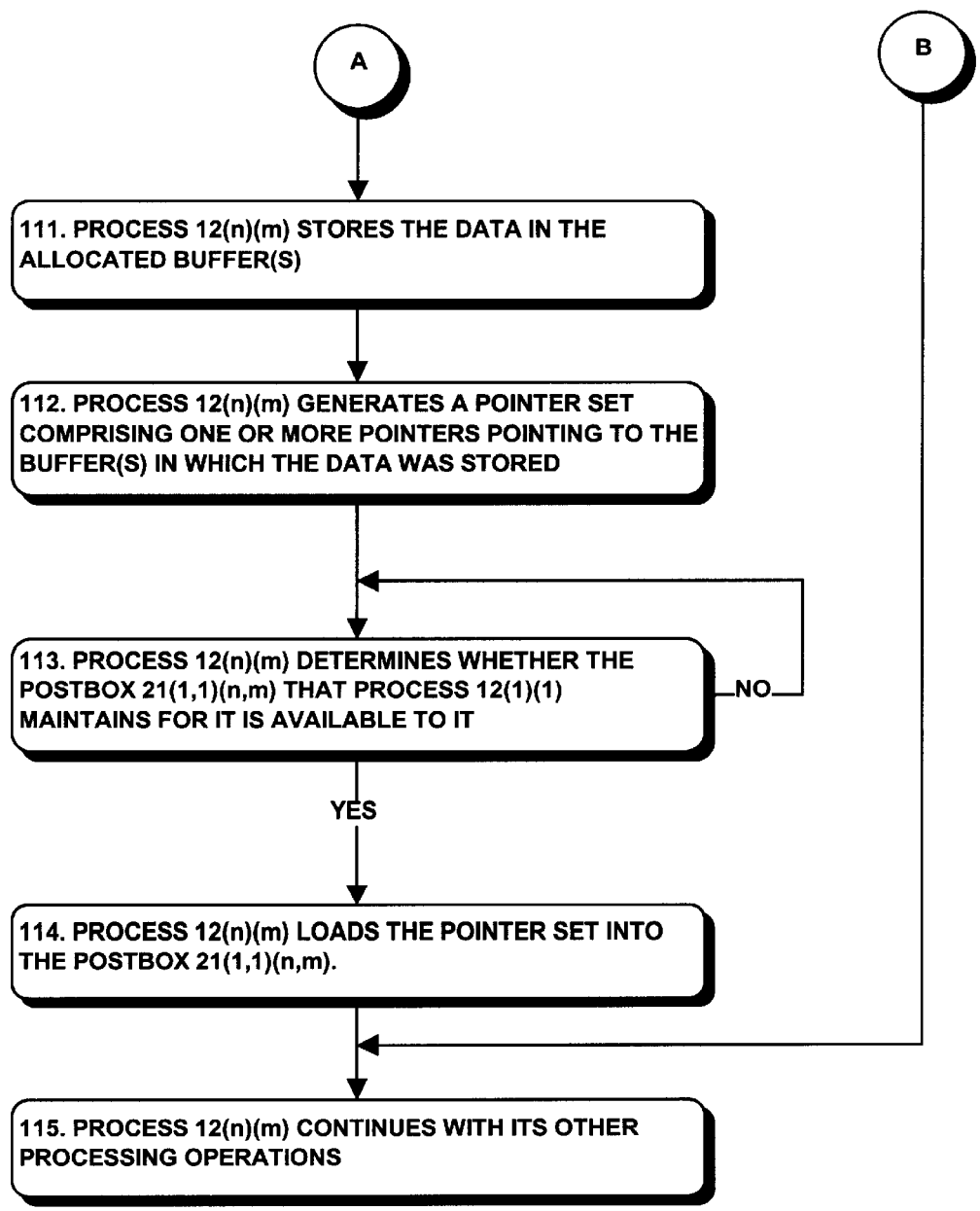
Figure 4:
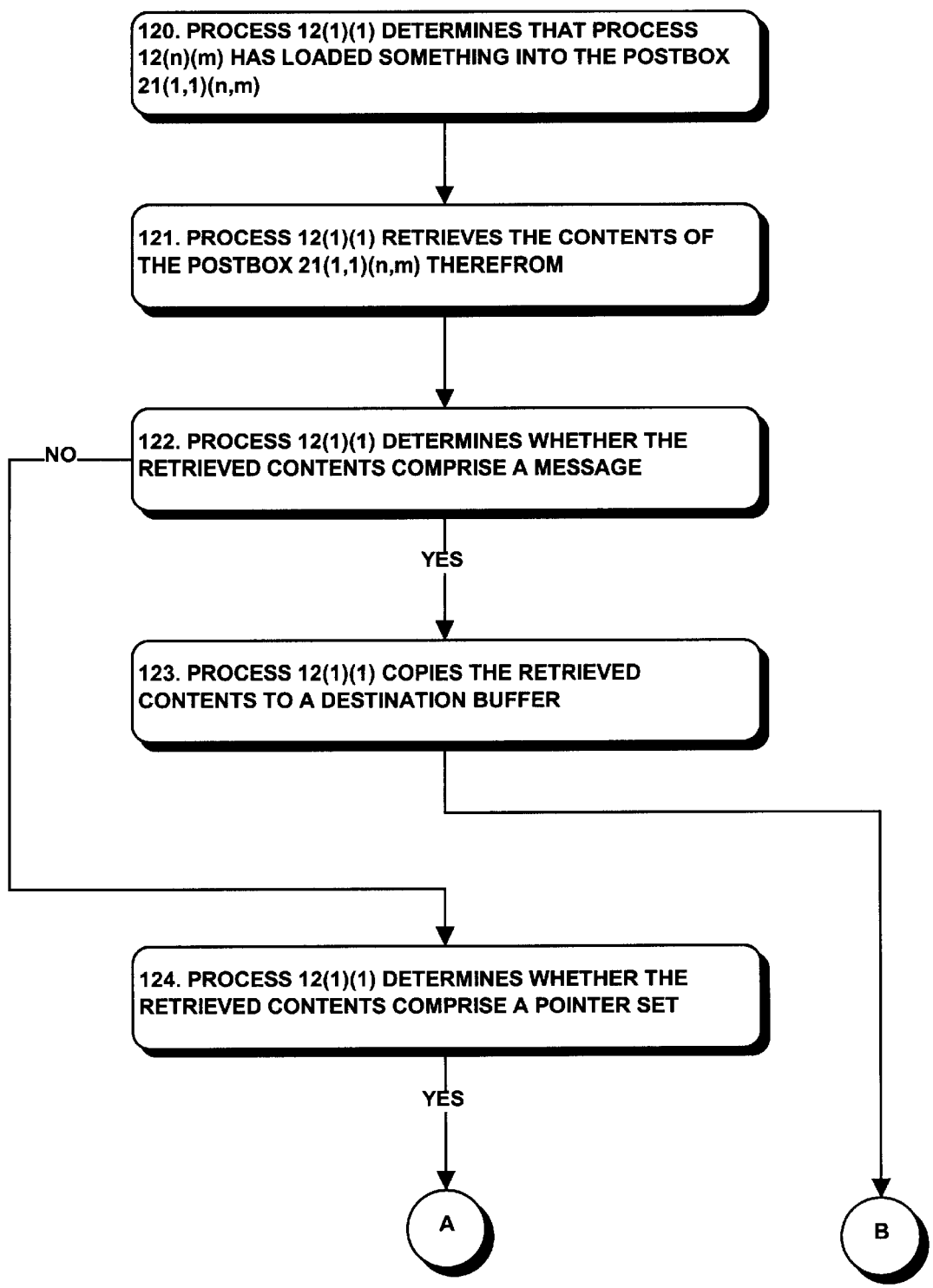
FIG. 4 is a flow chart describing operations performed by a process in connection with receiving a message using the buffer allocation arrangement.
Figure 4A:
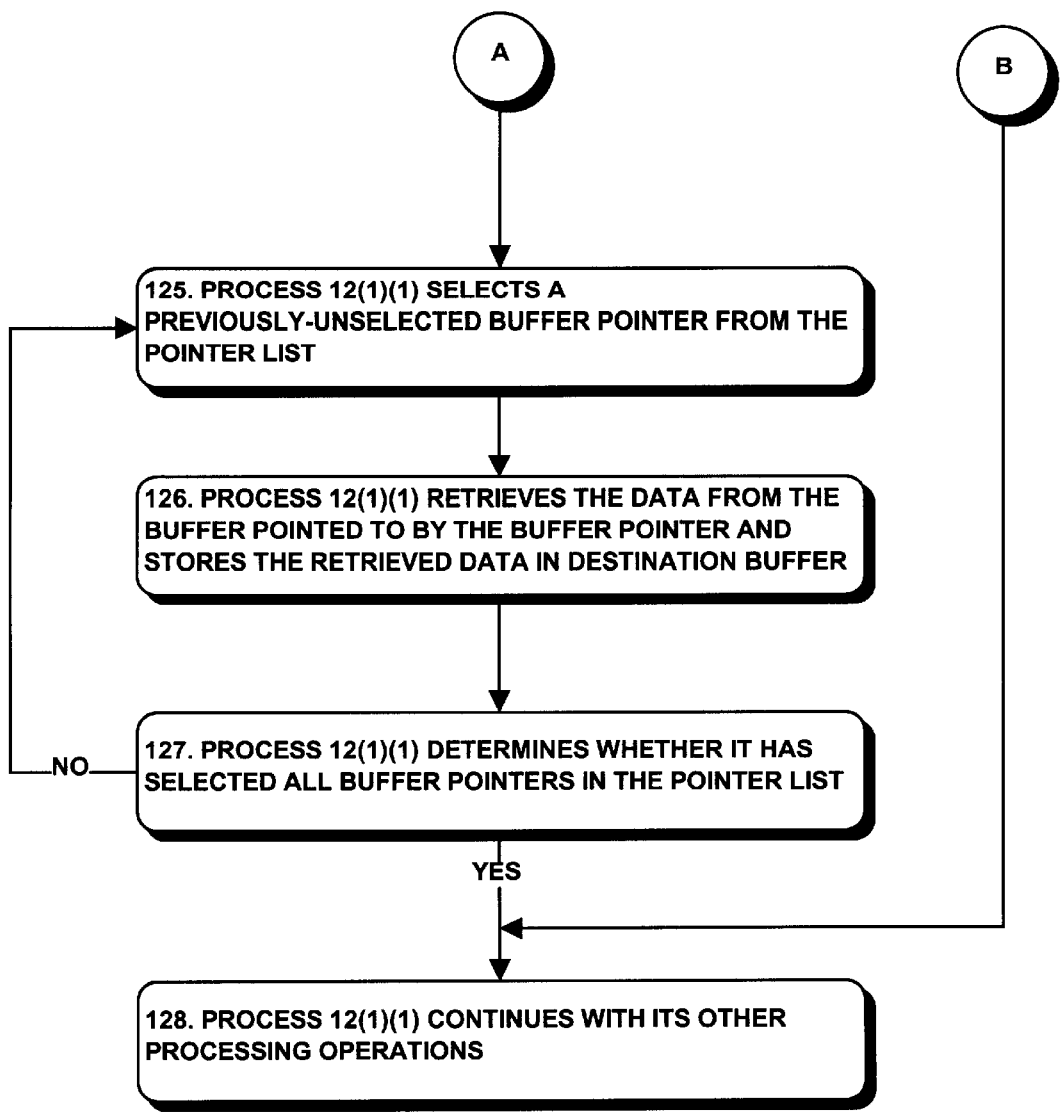

The buffer allocation arrangement will be described in greater detail in connection with FIGS. 2 through 4, with FIG. 2 schematically depicting the arrangement of buffers and postboxes associated with the respective processes, and FIGS. 3 and 4 depicting a flow chart describing operations performed by the processes in connection with transfer of messages using the buffers and postboxes depicted in FIG. 2. With reference initially to FIG. 2, that FIG. particularly depicts data structures maintained by the common memory 13(1) associated with the processes 12(1)(m) of SMP 11(1) in connection with the buffer allocation arrangement. Generally, the data structures provided in all of the regions for the respective processes 12(1)(m) will be similar, and so only structures provided in region 13(1)(1) are shown in detail. As shown in FIG. 2, region 13(1)(1) includes a postbox block 20(1)(1) and a buffer pool 22. The postbox block 20(1)(1), in turn, includes a plurality of postboxes 21(1,1)(1) through 21(1,1)(P) (generally identified by reference numeral 22(1,1)(n,m)), each of which is associated with one of the other processes comprising, for example, the program which includes or makes use of the process 12(1) (1) associated with the region 13(1)(1) and thus will need to communicate with it and transmit messages thereto. Thus, if, for example, only processes 12(1)(2) through 12(1)($M_1$) need to transmit messages to process 12(1)(1), the postbox block 20(1)(1) will need to provide "$M_1$–1" postboxes 21(1,1)(P) (that is, P=$M_1$–1). On the other hand, if all of the processes in all of the SMP's 11(n) will need to transmit messages to process 12(1)(1), the postbox block 20(1)(1) will need to provide ($M_1$1–1)+$M_2$++$M_N$ postboxes 22(1,1) (P). The buffer pool 22 comprises a plurality of buffers 22(1) through 22(B) (generally identified by reference numeral 22(b)).

Preferably, each postbox 21(1,1)(p) will be relatively small, and will be used by a process 12(m)(n) to transfer relatively short messages to the process 12(1)(1). On the other hand, buffers 22(b) will be relatively large, and will be used by the process 12(1)(1) to transfer relatively long messages to other processes 12(n)(m). A process 12(n)(m), if it wishes to transfer a relatively long message to the process 12(1)(1), will, in addition to storing the message data in one or more buffers that is maintaining in the buffer pool in its respective region 13(n)(m) of the common memory 13(n), also store a set of one or more pointers to the respective buffer(s) in a postbox 21(1,1)(p) maintained for process 12(1)(1) in its region 13(1)(1) of the common memory 13(1).

In either case, the process 12(1)(1) thereafter copy the data to a destination buffer therefor (not shown) in its region 13(1)(1). That is, if the message is relatively small, such that it was stored in a postbox 21(1,1)(p), the process 12(1)(1) can copy the contents of the postbox 21(1,1)(p) to the destination buffer, after which the postbox 21(1,1)(p) will be available for another message or pointer set. On the other hand, if the message is relatively large, such that data therefor was stored in one or more buffers in the buffer pool maintained by the transmitting process 12(n)(m) and a pointer set thereto stored in a postbox 21(1,1)(p), the process 12(1)(1) can use the pointer(s) in the pointer set to identify the buffer(s) in which the message data was deposited by the process 12(n)(m), and thereafter copy the data from the buffer(s) in the region 13(n)(m) in which transmitting process 12(n)(m) had stored the data, to the destination buffer in its region 13(1)(1). Thereafter, both the buffer(s) in region 13(n)(m) will be available for another message, and the postbox 21(1,1)(p) will be available for another message or pointer set.

Operations performed by a process in connection with transferring messages using the buffer allocation arrangement will be described in connection with the flowchart depicted in FIGS. 3 and 4, with FIG. 3 depicting operations performed by the process 12(n)(m) that is transferring a message to the process 12(1)(1) and FIG. 4 depicting operations performed by the process 12(1)(1) during the transfer. With reference to FIG. 3, when process 12(n)(m) determines that it is to transfer a message to process 12(1)(1) (step 100), it will initially determine whether the message is sufficiently small as to be accommodated by a postbox 21(1,1)(p) (step 101). If the process 12(n)(m) makes a positive determination in step. 101, it will determine whether a postbox 21(1,1)(p) is available. In one embodiment, the process 12(1)(1) maintains a postbox 21(1,1)(p) associated with each process that is able to transfer messages thereto, and in that case the process 12(n)(m) will determine whether the postbox 21(1,1)(n,m) that process 12(1)(1) maintains for it (that is, process 12(n)(m)) is available to it (that is, process 12(n)(m)) (step 102). The postbox 21(1,1)(n,m) may not be available to process 12(n)(m) for several reasons, including, for example, (i) the process 12(n)(m) had previously stored a message in the postbox 21(1,1)(n,m) which the process 12(1)(1) had not copied to a destination buffer, or (ii) the process 12(n)(m) had previously stored a message in one or more buffers maintained in the region 13(n)(m) associated with process 12(n)(m) and provided pointer set therefor in the postbox 21(1,1)(n,m), which pointer set the process 12(1)(1) had not retrieved therefrom for use in identifying the buffer(s) containing the data to be copied. If the process 12(n)(m) makes a negative determination in step 102, that is, if it determines that the postbox 21(1,1)(n,m) maintained for it (that is, process 12(n)(m)) by process 12(1)(1), is not available to it, it will wait at step 102. On the other hand, when the process 12(n)(m) determines in step 102 that the postbox 21(1,1)(n,m) maintained for it (that is, process 12(n)(m)) by process 12(1)(1) is available to it, it will sequence to step 103, in which it will load the message into the postbox 21(1,1)(n,m).

Returning to step 101, if the process 12(n)(m) makes a negative determination in that step, that is, if it determines that the message is too large to be accommodated by a postbox 21(1,1)(n,m), it (that is, process 12(n)(m)) will proceed to step 110 in which it will allocate one or more buffers in the buffer pool which it maintains in its memory region 13(n)(m) in which to store the message data, store the data therein (step 111), and generate a pointer set comprising one or more pointers pointing to the buffer(s) in which the data was stored (step 112). Thereafter, the process 12(n)(m) performs a series of operations, similar to those described above in connection with steps 102 and 103, to store the pointer set in a postbox 21(1,1)(n,m) maintained by the process 12(1)(1) associated with the process 12(n)(m). In those operations, the process 12(n)(m) initially determines whether the postbox 21(1,1)(n,m) that process 12(1)(1) maintains for it (that is, process 12(n)(m)) is available to it (that is, process 12(n)(m)) (step 113). If the process 12(n)(m) makes a negative determination in step 113, it will wait at step 113. On the other hand, when the process 12(n)(m) determines in step 113 that the postbox 21(1,1 )(n,m) maintained for it (that is, process 12(n)(m)) by process 12(1)(1) is available to it, it will sequence to step 114, in which it will load the pointer set into the postbox 21(1,1)(n,m). Following step 114, or step 104 if the process 12(n)(m) determined in step 101 that the message to be transferred was sufficiently small as to be accommodated in the postbox 21(1,1)(n,m), the process 12(n)(m) can continue with its other processing operations (step 115).

FIG. 4 is a flowchart depicting operations performed by the process 12(1)(1) during a transfer of a message from another process 12(n)(m). With reference to FIG. 4, when the process 12(1)(1) determines that process 12(n)(m) has loaded something into the postbox 21(1,1)(n,m) (step 120), it will retrieve the contents of the postbox 21(1,1)(n,m) therefrom (step 121) Prior to the process 12(1)(1) retrieving the contents of the postbox 21(1,1)(n,m), the postbox 21(1,1)(n,m) will not be available to the process 12(n)(m) as noted above in connection with steps 102 and 113; however, after the process has retrieved the contents of the postbox 21(1,1)(n,m), the postbox 21(1,1)(n,m) will be available to the process 12(n)(m), in which case it (that is, the process 12(n)(m)) will be able to store a message (reference step 102) or pointer set (reference step 113). In any case, after retrieving the contents of the postbox 21(1,1)(n,m) in step 121, the process 12(1)(1) will determine the nature of the retrieved contents. Initially, the process 12(1)(1) will determine whether the retrieved contents comprise a message (step 122). If the process 12(1)(1) makes a positive determination in step 122, it will copy the retrieved contents to a destination buffer (step 123).

Returning to step 122, if the process 12(1)(1) makes a negative determination in that step, which will occur if the retrieved contents do not comprise a message, it (that is, the process 12(1)(1)) will determine whether the retrieved contents comprise a pointer set (step 124). If the process 12(1)(1) makes a positive determination in that step, it will proceed to process each pointer in the pointer set to identify the buffer(s) identified thereby, retrieve the data therefrom and copy it (that is, the data) into the destination buffer maintained in its region 13(1)(1) of the common memory 13(1). In those operations, the process 12(1)(1) will initially select a previously-unselected buffer pointer from the pointer list (step 125) and retrieve the data therefrom and store the retrieved data in the destination buffer (step 126). Thereafter, the process 12(1)(1) determines whether it has selected all buffer pointers in the pointer list (step 127), and if so returns to step 125 to select another buffer pointer which has not been previously selected. The process 12(1)(1) processes steps 125 through 127 through one or more iterations, in each iteration copying data from the buffer pointed to by the buffer pointer selected in step 125 to the destination buffer. When the process 12(1)(1) finally determines in step 127 that it has selected all of the buffer pointers in the buffer pointer list it will have transferred all of the data from the buffer(s) in which the message data was stored to the destination buffer.

Returning to step 124, if the process 12(1)(1) makes a negative determination in that step (not shown), it will have determined that the retrieved contents from the postbox 21(1,1)(n,m) constitutes neither a message (reference step 122) or a pointer set to buffers containing a message (reference step 124). In that case, an error condition may exist, in which case the process 12(1)(1) may proceed to process an error routine (not shown). Alternatively, a process 12(n)(m) may load items other than a message or a pointer set to a message in the postbox 21(1,1)(n,m), and the process 12(1)(1) may process the retrieved contents in relation thereto. In any case, following step 127, or step 123 if the process 12(1)(1) determined in step 122 that the contents of the postbox 21(1,1)(n,m) contained a message, the process 12(1)(1) can continue with its other processing operations (step 128), which may include, for example, providing a status notification to the process 12(n)(m) indicating whether the message has been successfully received.

As noted above, the computer system 10 may comprise a plurality of SMP's 11(n). If the computer system 10 does comprise a plurality of SMP's the process 12(n)(m) which is transmitting the message and process 12(1)(1) which is receiving the message may reside on different SMP's. To efficiently accommodate that, in one embodiment each SMP 11(n') is provided with a region of memory that may be used by processes 12(n")(m) of one of the other SMP's 11(n") (n" n'), as well as its (that is, SMP 11(n')'s) processes 12(n')(m). The processes 12(n")(m) of SMP 11(n") can create respective buffer pools in that memory region comprising buffers which they can use to transfer messages to processes 12(n')(m) of SMP 11(n'). The processes 12(n')(m) of SMP 11(n') will have postboxes 20(n',m)(n",m) in their respective regions 13(n')(m) of the common memory 13(n') of SMP 11(n') in which the processes 12(n")(m) of SMP 11(n") can also load messages therefor (that is, for processes 12(n')(m)) or a buffer pointer set containing one or more pointers to buffer(s) in the buffer pool that they maintain on the respective SMP 11(n'). Thus, in that embodiment, when a process 12(n")(m) transfers a message to another process 12(n')(m), the message will in any case be located on the SMP 11(n') so that the processes 12(n')(m) would be able to receive the message relatively quickly.

Figure 5:
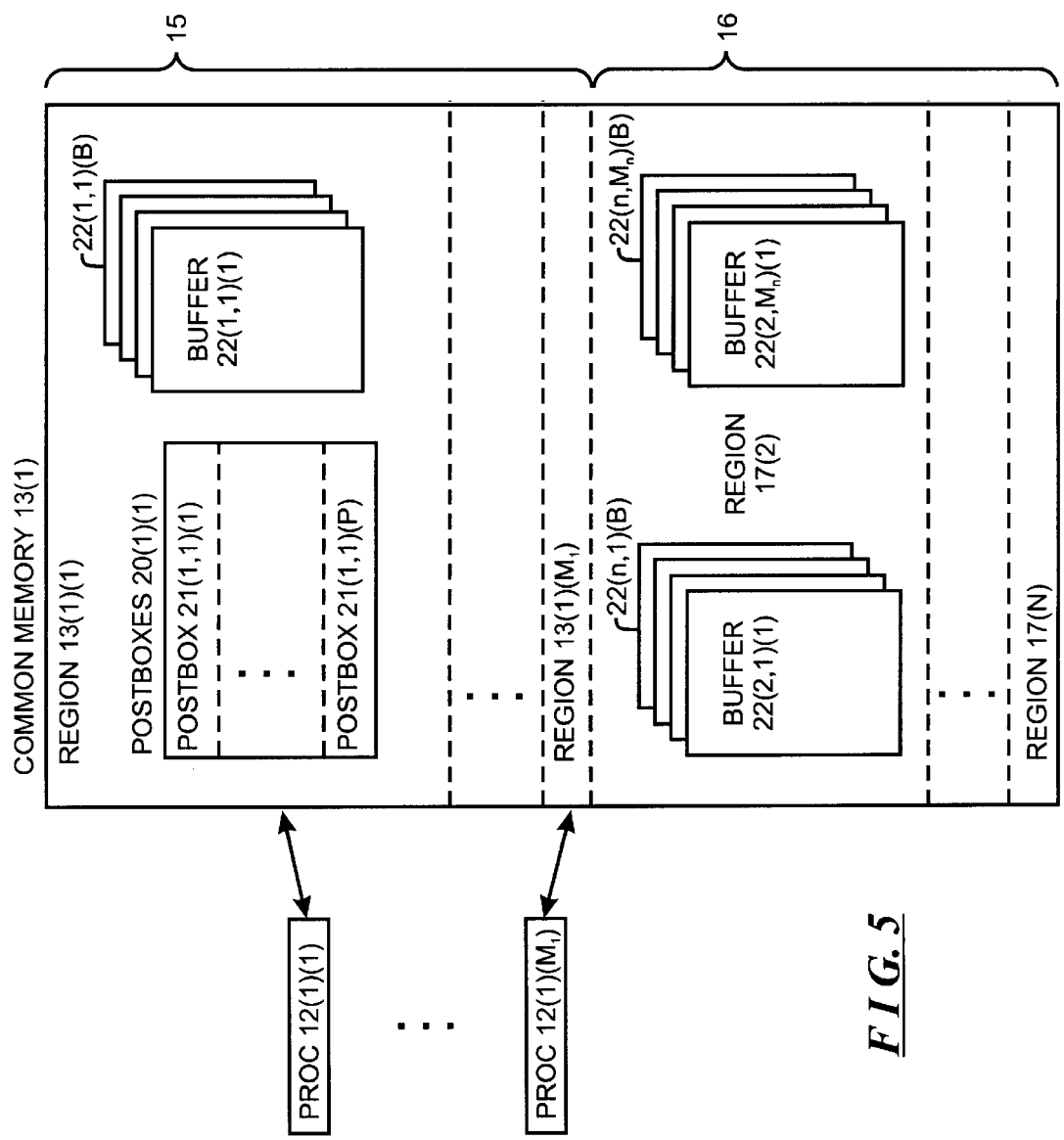
FIG. 5 schematically depicts data structures which are useful in connection with a second embodiment of the buffer allocation arrangement.

This will be described in connection with FIG. 5. As with FIG. 2, FIG. 5 specifically depicts the common memory 13(1) of SMP 11(1), and includes, in addition to the "local" portion 15 described above in connection with FIG. 2, a remote portion 16. The remote portion 16, in turn, includes a plurality of regions 17(2) through 17(N) (generally identified by reference numeral 17(n)) each of which is associated with the correspondingly indexed SMP 11(2) through 11(N). Each region 17(n), in turn, can include one or more buffer pools each comprising one or more buffers 22(n,m)(1) through 22(n,m)(B) (generally identified by reference numeral 22(n,m)(b)) which is associated with the correspondingly indexed process 12(n)(m) executed by the respective SMP 11(n). When a process 12(n)(m) executed by an SMP 11(n) wishes to transfer a message to a process 12(1)(m') executed by SMP 11(1), and if the message is not accommodated by the postbox 21(1,m')(n,m) maintained by the process 12(1)(m') for process 12(n)(m), it (that is, the process 12(n)(m)) will load the data for the message into one or more buffers 22(n,m)(b) in its buffer pool in the remote portion 15 and load a pointer set to the buffer(s) into the postbox 21(1,m')(n,m). It will be appreciated that these operations will include transfers between the SMP's 11(n) and 11(1) over the communication link 14. After the process 12(1)(m') determines that a pointer set has been loaded into the postbox 21(1,m')(n,m), it can process the pointer set as described above in connection with FIG. 4.

The SMP 11(1) may maintain a region 17(n) in its remote portion 16 associated with each of the other SMP's 11(2) through 11(N), or only for those SMP's which are executing processes 12(n)(m) which need to transfer messages to the processes 12(1)(m) executed by it (that is, SMP 11(1)). Similarly, within each region 17(n), the SMP 11(1) may maintain a buffer pool for all processes 12(n)(m) which are executed by the SMP 11(n), or only for those processes 12(n)(m) which need to transfer messages to the processes 12(1)(m) executed by it (that is, SMP 11(1)). In addition, each of the other SMP's 11(2) through 11(N) may maintain remote regions and buffer pools in a similar manner.

It will be appreciated that, although a process 12(n)(m) may make use of buffers 22(n,m)(b) in its buffer pool in a remote portion 16 maintained by an SMP 11(n') when transferring a message to a process 12(n')(m') executed thereby, the process 12(n)(m) may instead or in addition make use of buffers maintained in its region 13(n)(m) of the memory 13(n) of SMP 11(n) when transferring a message.

The invention provides a number of advantages. In particular, the invention provides a buffer allocation arrangement for use in connection with transferring of messages in which the number of buffers vary according to the number of message-transferring processes, instead of the square of the number of such processes. In addition, since each process 12(n)(m) has ownership over the buffers in its buffer pool, the buffer allocation arrangement avoids the necessity of allocating a buffer from a common pool, with the attendant synchronization mechanism, as is required in connection with the second shared-memory message passing mechanism described above, thus avoiding the lock/unlock bottleneck.

It will be appreciated that a system in accordance with the invention can be constructed in whole or in part from special purpose hardware or a general purpose computer system, or any combination thereof, any portion of which may be controlled by a suitable program. Any program may in whole or in part comprise part of or be stored on the system in a conventional manner, or it may in whole or in part be provided in to the system over a network or other mechanism for transferring information in a conventional manner. In addition, it will be appreciated that the system may be operated and/or otherwise controlled by means of information provided by an operator using operator input elements (not shown) which may be connected directly to the system or which may transfer the information to the system over a network or other mechanism for transferring information in a conventional manner.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by Letters Patent of the United States is:

1. A communication system for facilitating transfer of messages within a computer, said system comprising:
   a plurality of processes;
   a plurality of buffer pools each comprising a plurality of buffers, wherein each said buffer pool is allocated to and managed exclusively by a different process of the processes; and
   a plurality of groups of postboxes, each said group being allocated to a different process of the processes, wherein each said group of postboxes includes a postbox for at least each process of the processes other than a process to which the group is allocated;
   wherein each process of the processes includes:
      a message size determination module configured to determine whether a message to be transferred from a first process of the processes to a second process of the processes can be accommodated by a first postbox of a group of postboxes which is allocated to the first process, the first postbox corresponding to the second process; and
      a message transfer module configured to:
         store the message in the first postbox in response to a positive determination by said message size determination module; and
         store the message in a first buffer of a first buffer pool allocated to the first process and store a pointer to the first buffer in the first postbox, in response to a negative determination by said message size determination module.

2. The system of claim 1, further comprising a shared memory, wherein said memory comprises a plurality of regions, each of said regions allocated to a process of said plurality of processes.

3. The system of claim 1, wherein said second process is configured to access said first postbox in order to obtain said message.

4. The system of claim 3, wherein said second process is configured to retrieve said message from said first postbox in response to detecting said first postbox contains said message.

5. The system of claim 4, wherein said second process is configured to utilize said pointer to identify said first buffer and retrieve said message from said first buffer, in response to detecting said first postbox contains said pointer.

6. The system of claim 1, wherein said first process is configured to allocate said first buffer from said first buffer pool, in response to detecting said negative determination.

7. A communication method for facilitating transfer of messages, said method comprising:
- allocating a buffer pool to each process of a plurality of processes, wherein each said buffer pool is managed exclusively by a process to which it is allocated, and wherein each buffer pool comprises a plurality of buffers;
- allocating a plurality of postboxes to each process of said processes, wherein each of said plurality of postboxes includes a postbox for at least each of said plurality of processes other than a process to which said plurality of postboxes are allocated;
- determining whether a message to be transferred from a first process of said processes to a second process of said processes can be accommodated by a first postbox, wherein said first postbox is allocated to said first process and corresponds to said second process;
- storing the message in the first postbox in response to determining said first postbox will accommodate said message; and
- storing the message in a first buffer of a buffer pool allocated to the first process, and storing a pointer to said first buffer in the first postbox, in response to determining said first post box will not accommodate said message.

8. The method of claim 7, further comprising said second process accessing said first postbox in order to obtain said message.

9. The method of claim 8, further comprising said second process retrieving said message from said first postbox in response to detecting said first postbox contains said message.

10. The method of claim 9, further comprising said second process utilizing said pointer to identify said first buffer and retrieving said message from said first buffer, in response to detecting said first postbox contains said pointer.

11. The method of claim 7, further comprising said first process allocating said first buffer from a buffer pool allocated exclusively to said first process.

12. A computer program product comprising program instructions, wherein said program instructions are executable to:
- allocate a buffer pool to each process of a plurality of processes, wherein each said buffer pool which is allocated is managed exclusively by a process to which it is allocated, and wherein each buffer pool comprises a plurality of buffers;
- allocate a plurality of postboxes to each process of said processes, wherein each of said plurality of postboxes includes a postbox for at least each of said plurality of processes other than a process to which said plurality of postboxes are allocated;
- determine whether a message to be transferred from a first process of said processes to a second process of said processes can be accommodated by a first postbox, wherein said first postbox is allocated to said first process and corresponds to said second process;
- store the message in the first postbox in response to determining said first postbox will accommodate said message; and
- store the message in a first buffer of a buffer pool allocated to the first process, and store a pointer to said first buffer in the first postbox, in response to determining said first post box will not accommodated said message.

13. The computer program product of claim 12, wherein said program instructions are further executable to access said first postbox in order to obtain said message, wherein said access is by said second process.

14. The computer program product of claim 13, wherein said program instructions are further executable to retrieve said message from said first postbox in response to detecting said first postbox contains said message, wherein said message is retrieved by said second process.

15. The computer program product of claim 14, wherein said program instructions are further executable to utilize said pointer to identify said first buffer and retrieve said message from said first buffer, in response to detecting said first postbox contains said pointer.

16. The computer program product of claim 12, wherein said program instructions are further executable to allocate said first buffer from a buffer pool allocated exclusively to said first process.

17. A multi-node computing system comprising:
- a first node configured to execute a first plurality of processes, said first node including a memory which includes a local portion and a remote portion; and
- a second node coupled to said first node via a communication link, wherein said second node is configured to execute a second plurality of processes;
- wherein the local portion of said memory includes separate regions allocated to each process of the first plurality of processes, wherein each region includes:
  - a first plurality of postboxes including a postbox for one or more processes of the first plurality of processes; and
  - a first buffer pool comprising a plurality of buffers managed by the process to which the first buffer pool is allocated;
- wherein the remote portion includes a first region allocated to the second node, wherein each process of the second plurality of processes is allocated within said first region:
  - a second plurality of postboxes including a postbox for one or more of the first plurality of processes; and
  - a second buffer pool comprising a plurality of buffers managed by the process to which the second buffer pool is allocated.

18. The system of claim 17, wherein the first node is configured to facilitate transfer of a message from a first process of the first plurality of processes to a second process of the first plurality of processes by storing the message in a first postbox of the first plurality of postboxes which is allocated for the purpose of transferring messages from the first process to the second process.

19. The system of claim 18, wherein the first node is configured to store the message in the first postbox in response to a determination that the first postbox is capable of accommodating the message.

20. The system of claim 19, wherein in response to a determination that the first postbox is not capable of accommodating the message, the first node is configured to:
   allocate a first buffer from the first buffer pool for storage of the message;
   store the message in the first buffer; and
   store a pointer to the first buffer in the first postbox.

21. The system of claim 20, wherein the second process is configured to access the first postbox in order to obtain the message.

22. The system of claim 17, wherein the second node is configured to transfer a message from a first process of the second plurality of processes to a first process of the first plurality of processes by storing the message in a first postbox of the second plurality of postboxes which is allocated for the purpose of transferring messages from the first process of the second node to the second process of the first node.

23. The system of claim 22, wherein the second node is configured to store the message in the first postbox in response to a determination that the first postbox is capable of accommodating the message.

24. The system of claim 23, wherein in response to a determination that the first postbox is not capable of accommodating the message, the second node is configured to:
   allocate a first buffer from the second buffer pool for storage of the message;
   store the message in the first buffer; and
   store a pointer to the first buffer in the first postbox.

25. The system of claim 24, wherein the second process is configured to access the first postbox in order to obtain the message.

26. A method for facilitating transfer of messages between nodes in a multi-node computing system, said method comprising:
   executing a first process of a plurality of processes on a first node of said system, the first node including a memory which includes a local portion and a remote portion;
   executing a second process on a second node of said system, wherein the second node is coupled to the first node via a communication link;
   allocating a first region of the local portion of said memory to the first process, wherein said first region includes:
      a first plurality of postboxes including a postbox for one or more processes of the first plurality of processes; and
      a first buffer pool comprising a plurality of buffers managed by the first process;
   allocating a first region of the remote portion of said memory to the second node, wherein allocated to the second process within the first region of the remote portion is:
      a second plurality of postboxes including a postbox for one or more of the first plurality of processes; and
      a second buffer pool comprising a plurality of buffers managed by the second process.

27. The method of claim 26, wherein the first node is configured to facilitate transfer of a message from the first process to the second process by storing the message in a first postbox of the first plurality of postboxes which is allocated for the purpose of transferring messages from the first process to the second process.

28. The method of claim 27, wherein the first node is configured to store the message in the first postbox in response to a determination that the first postbox is capable of accommodating the message.

29. The method of claim 28, wherein in response to a determination that the first postbox is not capable of accommodating the message, the first node is configured to:
   allocate a first buffer from the first buffer pool for storage of the message;
   store the message in the first buffer; and
   store a pointer to the first buffer in the first postbox.

30. The method of claim 29, wherein the second process is configured to access the first postbox in order to obtain the message.

31. The method of claim 28, wherein the second node is configured to transfer a message from the second process to the first process by storing the message in a first postbox of the second plurality of postboxes which is allocated for the purpose of transferring messages from the second process to the first process.

32. The method of claim 31, wherein the second node is configured to store the message in the first postbox in response to a determination that the first postbox is capable of accommodating the message.

33. The method of claim 32, wherein in response to a determination that the first postbox is not capable of accommodating the message, the second node is configured to:
   allocate a first buffer from the second buffer pool for storage of the message;
   store the message in the first buffer; and
   store a pointer to the first buffer in the first postbox.

34. The method of claim 33, wherein the first process is configured to access the first postbox in order to obtain the message.

35. A computer program product comprising program instructions, wherein said program instructions are executable to:
   execute a first process of a plurality of processes on a first node of a multi-node system, the first node including a memory which includes a local portion and a remote portion;
   execute a second process on a second node of the system, wherein the second node is coupled to the first node via a communication link;
   allocate a first region of the local portion of said memory to the first process, wherein said first region includes:
      a first plurality of postboxes including a postbox for one or more processes of the first plurality of processes; and
      a first buffer pool comprising a plurality of buffers managed by the first process;
   allocate a first region of the remote portion of said memory to the second node, wherein allocated to the second process within the first region of the remote portion is:
      a second plurality of postboxes including a postbox for one or more of the first plurality of processes; and
      a second buffer pool comprising a plurality of buffers managed by the second process.

36. The computer program product of claim 35, wherein the first node is configured to facilitate transfer of a message from the first process to the second process by storing the message in a first postbox of the first plurality of postboxes which is allocated for the purpose of transferring messages from the first process to the second process.

37. The computer program product of claim 36, wherein the first node is configured to store the message in the first postbox in response to a determination that the first postbox is capable of accommodating the message.

38. The computer program product of claim 37, wherein in response to a determination that the first postbox is not capable of accommodating the message, said program instructions are further executable to:
   allocate a first buffer from the first buffer pool for storage of the message;
   store the message in the first buffer; and
   store a pointer to the first buffer in the first postbox.

39. The computer program product of claim 38, wherein the second process is configured to access the first postbox in order to obtain the message.

40. The computer program product of claim 37, wherein the second node is configured to transfer a message from the second process to the first process by storing the message in a first postbox of the second plurality of postboxes which is allocated for the purpose of transferring messages from the second process to the first process.

41. The computer program product of claim 40, wherein the second node is configured to store the message in the first postbox in response to a determination that the first postbox is capable of accommodating the message.

42. The computer program product of claim 41, wherein in response to a determination that the first postbox is not capable of accommodating the message, the second node is configured to:
   allocate a first buffer from the second buffer pool for storage of the message;
   store the message in the first buffer; and
   store a pointer to the first buffer in the first postbox.

43. The computer program product of claim 42, wherein the first process is configured to access the first postbox in order to obtain the message.

* * * * *

UNITED STATES PATENT AND TRADEMARK OFFICE
CERTIFICATE OF CORRECTION

PATENT NO. : 6,601,089 B1
DATED : July 29, 2003
INVENTOR(S) : Sistare et al.

It is certified that error appears in the above-identified patent and that said Letters Patent is hereby corrected as shown below:

<u>Column 12,</u>
Line 15, please delete "accommodated" and replace with -- accommodate --.

Signed and Sealed this

Thirteenth Day of January, 2004

JON W. DUDAS
*Acting Director of the United States Patent and Trademark Office*